UNITED STATES PATENT OFFICE.

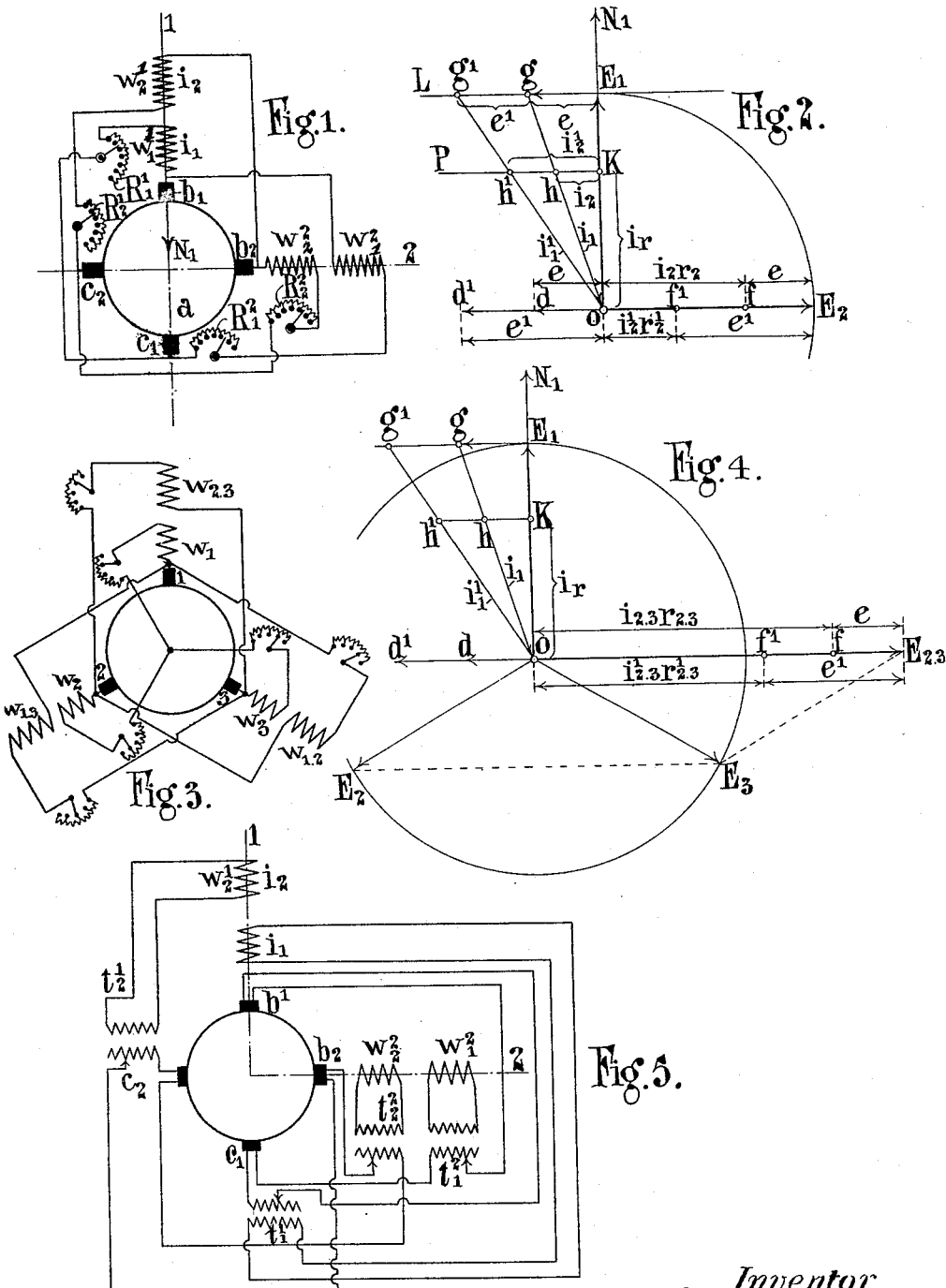

ARTHUR SCHERBIUS, OF BADEN, SWITZERLAND.

VARIABLE-FREQUENCY COMMUTATOR-MACHINE.

1,127,290. Specification of Letters Patent. Patented Feb. 2, 1915.

Application filed April 3, 1911. Serial No. 618,640.

*To all whom it may concern:*

Be it known that I, ARTHUR SCHERBIUS, a subject of the German Emperor, and residing at Parkstrasse, Baden, Switzerland, have invented certain new and useful Improvements in and Relating to Variable-Frequency Commutator-Machines, of which the following is a specification.

This invention relates to self-excited alternating current commutator machinery for variable frequency.

It has heretofore been proposed to excite compensated polyphase machines of certain constructions by two phases operating on each pole so that these machines being driven as generators can excite themselves and at a constant speed can supply currents of different frequencies. The adjustment of the different frequencies can be obtained by varying the ratio of the number of turns in the windings of the two phases on one pole, or the reactances and resistances in the exciting circuit. In general the frequency in this regulation is altered with the voltage and if it is desired, for example, to obtain constant voltage with variable frequency, on each alteration of the frequency the voltage has to be adjusted to its previous value so that the process of regulation is very complicated.

The object of the present invention is to make possible in a simple electrical manner an independent regulation of the frequency and voltage without having to alter the number of turns of the exciting windings.

This invention consists in arranging the two exciting windings of one pole, whereby regulation of the circuit of one winding, for example by means of a resistance, substantially affects the frequency only without affecting the voltage; while regulation of the circuit of the other winding controls the voltage only without substantially altering the frequency.

The invention also consists in an arrangement for the purposes referred to above in which the two windings are fed from voltages displaced by a definite phase angle such as 90° with respect to one another.

Referring now to the accompanying diagrammatic drawings, Figure 1 represents a construction according to one form of the present invention for a two-phase compensated commutator generator with drum winding and shunt excitation; Fig. 2 is a vector diagram explaining the action of a construction of the kind shown in Fig. 1; Fig. 3 shows a modification of the invention applied to a three-phase machine according to one form, and Fig. 4 is a vector diagram corresponding to Fig. 3. Fig. 5 represents a construction according to one form of the present invention in which the shunt coils are excited by means of transformers.

The reference letters as applied to the drawings are so selected as to have the exponents indicate the axis in which the coils are situated and the subscripts the axes in which they are connected.

In carrying the invention into effect in the form illustrated by way of example in Fig. 1, the commutator generator $a$ is excited in the axis 1 by the windings $w'_1$ and $w'_2$ and in the axis 2 by the windings $w^2_2$ and $w^2_1$. The winding $w'_1$ is connected to the brush $b_1$ at one end and at the other end to the rheostat $R^1_1$ and thence to the brush $c_1$. The winding $w'_2$ is connected at one end to the brush $b_2$ and at the other to the resistance $R^1_2$ and thence to the brush $c_2$. The winding $w^2_2$ is also connected to the brush $b_2$ and by way of the resistance $R^2_2$ to the brush $c_2$. The remaining winding $w^2_1$ is connected at one end by way of the resistance $R^2_1$ to the brush $c_1$. Thus the field winding along the axis 1 consists of two windings of equal number of turns (this is assumed for simplicity but is not essential) of which $w^1_1$ is connected across the voltage of axis 1 and the winding $w^1_2$ across the voltage of axis 2 and the windings of the axis 2 are correspondingly connected.

Assuming that the machine is running as a self-excited generator the frequency may be varied, keeping the voltage constant by varying the resistance in the windings which are excited by the brushes displaced 90° from the axis of the corresponding winding, *i. e.*, the resistances $R'_2$ and $R^2_1$ of Fig. 1, the two other resistances remaining unaltered. The frequency decreases with the increase of the resistances $R'_2$ and $R^2_1$ and becomes zero when the circuit is broken, *i. e.*, the machine will then deliver continuous current. Similarly the value of the voltage can be adjusted by varying the resistances $R^2_1$ and $R^2_2$. The explanation of the effect can be found from Fig. 2 which has been drawn for one phase, for example the phase 1, the number of turns of the separate coils being considered as equal. $N_1$ is the power flux along the axis 1. At first it is assumed that the machine is running at no load. The rotational voltages $OE_1$ and $OE_2$ that is the voltages generated by the rotation of the armature $a$ in the magnetic fields prevailing, then coincide with the corresponding terminal voltages. $Od=e$ represents in magnitude and direction the E. M. F. which is induced by the flux $N_1$ in each of the two exciting windings of the axis 1, with any frequency $c$. In order to have equilibrium it is necessary, (a) that the resultant magnetomotive force of the two windings must lie in the direction of $OE_1$ and be of the same magnitude corresponding to this voltage. This is because of the condition that in commutator machines the resultant excitation field must be in phase with the rotational voltage; the voltages in the windings must remain in equilibrium with the brush voltage, viz., the E. M. F. triangle in the vector diagram of the circuit in question must be an inclosed figure and the brush E. M. F. must therefore maintain equilibrium of the geometric sum of the E. M. F. generated in the winding $w^1_1$ and the voltage drop in the regulating resistance.

In the following discussion:—$i_r$ represents the resultant excitation current. $i_2$ represents the current in coil $w'_2$ at frequency C. $i_1$ represents the current in coil $w'_1$ at frequency C. $e$ represents the E. M. F. induced in each exciting coil $w'_2$ and $w'_1$ at frequency C. $e_1$ represents the E. M. F. induced in each exciting coil $w'_2$ and $w'_1$ at frequency 2C. $i_2r_2$ represents the voltage drop in $w'_2$. $i'_2$ represents the current in coil $w'_2$ at frequency 2C. $i'_1$ represents the current in coil $w'_1$ at frequency 2C. $i_1r_1$ represents the voltage drop in circuit of winding $w'_2$ at frequency C. $i_1r_1$ represents the voltage drop in circuit of winding $w^2_1$ at frequency C. $r_2$ represents the resistance of coil $w'_2$. $N_1$ represents the power flux along axis 1. As the number of turns of all the windings are equal the excitation current may be taken as a measure of the magnetomotive forces; $i_r=OK$ the excitation current corresponding to the rotational voltage $E_1$; the currents in the windings $w'_1$ and $w'_2$ may be found in the following manner:—The voltage $Od=e$ is algebraically subtracted in the winding $w'_2$ from the terminal voltage $E_2$ (in the figure $E_2f=e$). $Of$ is the remainder equal to the ohmic voltage drop $i_2r_2$ in the circuit of winding $w'_2$; in the winding $w'_1$ the voltage $e=E_1g$ is geometrically combined with $OE_1$ and gives as ohmic voltage drop the vector $Og=i_1r_1$; since the current $i_2$ coincides in direction with $OE_2$, the triangle $KhO$ gives directly the two currents $i_2=Kh$ and $i_1=hO$. If the frequency is to be altered, say increased, the terminal voltage remaining constant, the resistance in the circuit $w'_2$ is diminished and the resistance in the circuit $w'_1$ kept constant (in the exciting circuits of the axis 2 a similar procedure is of course adopted); the resultant current $i_r$ must remain constant, and in addition the above mentioned conditions of equilibrium must be fulfilled. The directions of $i_2r_2$ and $e$ remain the same and at the same time the points $g$ and $h$ move along the straight lines $E_1L$ and PK. Assuming that double the frequency be obtained, then as the flux is to remain constant and equal to $N_1$, the induced E. M. F. of the windings becomes twice as large i. e., equal to $od'=e'=2e$; the ohmic voltage drop in the circuit $w'_1$ is seen from the triangle $E_1g^1O$ and is equal to $g^1O$; the current in the circuit $w'_1$ is $i'_1=h'O$. The relation $$\frac{g'O}{h'O}=\frac{gO}{hO}=r$$

being fulfilled owing to the resistance in the exciting circuit $w'_1$ being kept constant. We also have $$i'_2r'_2=Of'=E_2-e$$

from which $r'_2$ is determined; we see that $r'_2$ is smaller than $r_2$. The condition has now been fulfilled that with constant voltage the frequency has been doubled. By adjustment of the regulating resistance $R'_1$ and of the corresponding resistance $R^2_2$ in the axis 2, the magnitude of the voltage may then be adjusted.

Fig. 3 shows the method applied in one way to a three-phase machine. In this case for the two exciting windings of each axis the phase voltage of the same axis is used for one coil and the line voltage of the two other axes for the other coil, i. e., voltages with a phase displacement of 90° with respect to each other as in the case first considered. In the drawing the connections are completely shown for one phase only those for the other phases being similar.

The vector diagram Fig. 4 explains the method of regulation. The symbols are the same as in Fig. 2 and the reasoning relating to this said figure is immediately applicable to the present case.

The hereinbefore described method is not limited to the use of resistance for effecting the regulation. Regulable transformers may be utilized with advantage the primary winding being connected across the brushes and the secondary across the exciting windings, one form of such an arrangement being shown in Fig. 5 in which $t'_2$, $t'_1$, $t^2_2$ and $t^2_1$, are regulable transformers the secondary windings of which are connected across the respective exciting coils. The arrangement illustrated is otherwise similar to Figs. 1 and 3. The variation of the frequency with constant voltage is then effected by regulating the voltage at those windings which are excited from the brushes displaced at 90° with respect to the axes of the windings. The vector diagram remains essentially similar, except in that $R'_2$ and $R^2_1$ are now constant and $OE_2$ variable.

Strictly speaking the given vector diagrams hold good only for no load, but in practice however, they can be used for load conditions so that in the latter case also the frequency can be regulated by one winding while the voltage can be adjusted by the other. If a strictly independent regulation is to be effected under load conditions it can be obtained by compensating the voltage drop by means of a compound winding or the like. The method can obviously be extended to machines of any number of phases.

Commutator machines connected up in the above manner may be used with advantage as starters for motors without commutators, or as exciters for such starters.

Having now described my invention what I claim as new and desire to secure by Letters Patent is:—

1. In dynamo electric machinery in combination a commutator machine, a pair of brushes arranged in one axis of the machine and a further pair arranged in an axis at an angle thereto, an exciting winding operating in the first axis and fed by the voltage generated in that axis together with a further exciting winding arranged in the same axis and fed from the voltage generated in the second axis and two other windings arranged in said second axis and fed as to one winding from the voltage generated in the first axis and as to the other winding from the voltage generated in the second axis and four independently adjustable resistances one connected in series with each of said exciting windings; as set forth.

2. In dynamo electric machinery in combination in a self excited commutator machine, a commutator, brushes bearing on said commutator, two sets of exciting windings arranged at an angle and each comprising two coils, an adjustable resistance for each coil, electrical connections from one coil of each set to two of said brushes through the corresponding adjustable resistances and electrical connections between another winding of each set and two other of said brushes through corresponding adjustable resistances; as set forth.

3. In dynamo electric machinery in combination in an alternating current commutator machine a pair of brushes arranged in one axis of the machine and a further pair arranged in an axis at an angle thereto, an exciting winding operating in the first axis and fed by the voltage generated in that axis together with a further exciting winding arranged in the same axis and fed from the voltage generated in the second axis with means in connection with each winding for the independent control of said windings; as set forth.

4. In dynamo electric machinery, in combination in a self-excited commutator machine, exciting windings, means independent of the speed controlling the action of said windings to vary the frequency of said machine, further exciting windings and other means independent of the frequency controlling the action of said further windings for varying the voltage of the machine; as set forth.

In testimony whereof, I affix my signature in presence of two witnesses.

ARTHUR SCHERBIUS.

Witnesses:
ARTHUR J. BUNDY,
CARL GUBLER.

Copies of this patent may be obtained for five cents each, by addressing the "Commissioner of Patents, Washington, D. C."